United States Patent [19]

Hindin et al.

[11] 3,956,188

[45] May 11, 1976

[54] COMPOSITIONS AND METHODS FOR HIGH TEMPERATURE STABLE CATALYSTS

[75] Inventors: Saul G. Hindin, Mendham; Joseph C. Dettling, Jackson, both of N.J.

[73] Assignee: Engelhard Minerals & Chemicals Corporation, Murray Hill, N.J.

[22] Filed: Dec. 10, 1973

[21] Appl. No.: 423,114

[52] U.S. Cl. .......................... 252/465; 252/466 PT; 431/2
[51] Int. Cl.² ..................... B01J 23/16; B01J 23/62; B01J 23/82
[58] Field of Search ....................... 252/465, 466 PT

[56] References Cited
UNITED STATES PATENTS

| | | | |
|---|---|---|---|
| 2,742,437 | 4/1956 | Houdry............................ | 252/465 X |
| 3,002,920 | 10/1961 | Porter et al. ............. | 252/466 PT X |
| 3,679,768 | 7/1972 | Kmecak et al.................. | 252/465 X |
| 3,686,340 | 8/1972 | Patrick et al.............. | 252/466 PT X |
| 3,692,863 | 9/1972 | Kmecak et al................... | 252/465 X |
| 3,694,348 | 9/1972 | Bursian et al............. | 252/466 PT X |
| 3,821,105 | 6/1974 | Mitsche et al. ........... | 252/466 PT X |
| 3,852,215 | 12/1974 | Duhaut et al. ............. | 252/466 PT X |

*Primary Examiner*—Paul F. Shaver

[57] ABSTRACT

Catalysts having good high temperature stability which are particularly useful for selected high temperature reactions are disclosed as are methods for their preparation and use. The catalytically-active materials include platinum group metal deposited on a catalytic slip or composite which contains a mixture of alumina, a rare earth metal oxide, and a metallic oxide wherein the metal is IVB, selected VIB metals, and mixtures thereof. The slips or carrier compositions are calcined at a temperature of at least 850°C. before deposition of platinum group metal and characterized by having a surface area of at least 20 m²/g after calcination at a temperature of 1200°C. for two hours.

20 Claims, No Drawings

COMPOSITIONS AND METHODS FOR HIGH TEMPERATURE STABLE CATALYSTS

The present invention relates to catalyst compositions and methods for their preparation and use. In particular, this invention relates to catalyst compositions characterized by high stability thereby maintaining good catalytic activity.

Catalyst compositions exhibit a relatively high surface area per unit weight to allow the largest amount of reactants to contact the catalyst. Additionally, high surface area is important when the catalyst composition contains a precious metal such as platinum because of the cost of the metal and because of the dispersion required to prevent undue metal crystallite growth. It is desirable to retain this high surface area for long periods of use under severe conditions which might include reaction temperatures of 1200°C. or higher.

Alumina is an excellent and relatively economical carrier or support for many catalysts. Many crystalline forms of alumina, for example, chi, kappa, gamma, delta, eta, and theta, exhibit a very high surface area in relation to their weight. A serious drawback of alumina as a catalyst carrier, however, is its transition temperature of about 1000°–1200°C. to the alpha form which results in a substantial reduction of the surface area. It is thus extremely desirable to stabilize alumina-containing catalyst compositions based on high surface area aluminas to substantially prevent the transition to the low surface alpha form with a consequent loss in activity.

It is therefore an object of this invention to provide catalyst compositions, as well as methods for their preparation and use, which exhibit high temperature stability. Other objects and advantages will appear as the description proceeds.

Broadly, the catalyst composition of this invention includes a catalytically-active, calcined composite characterized by a surface area of at least 20 square meters per gram ($m^2/g$) after calcination for two hours at a temperature of 1200°C., said composite comprising or being a composite of alumina, a rare earth metal oxide and a metal oxide wherein the metal is selected from the group consisting of chromium, tungsten, a Group IVB metal and mixtures thereof. In preparing the catalyst composition, the composite is first calcined at a temperature of at least 850°C. and then a catalytically-effective amount of a platinum group metal is added to the composite. A catalyst composition prepared in accordance with this invention exhibits high temperature stability and therefore catalytic activity in a number of high temperature reactions, particularly high temperature combustion reactions.

The composite is formed by the calcination of an intimate admixture of an aluminum compound, rare earth metal compound and at least one metal compound wherein the metal is selected from the group consisting of chromium, tungsten, a Group IVB metal and mixtures thereof. Preferably, for certain methods of preparation, the aluminum compound is alumina. These compounds, as indicated, if not already in oxide form must be capable of forming or yielding their respective oxides upon calcination in air (oxygen) at a temperature of at least 850°C. The combination of the rare earth metal oxide and the other metal oxide or oxides may be considered as a high temperature stabilizing component for the alumina.

The relative amounts of alumina to the metal oxide stabilizing component, that is, the rare earth metal oxide and oxides of the metals of the Group IVB metals and chromium and tungsten and/or mixtures of these compounds, are governed largely by empirical criteria. While it is not desired that this invention be limited by the following theory, a brief statement may provide a helpful framework to further elucidate the invention. It is thought that the addition of the stabilizing component to the alumina or alumina precursor and calcination of the mixture at a temperature of at least 850°C. converts any of the non-oxide compounds to oxides and allows the stabilizing component oxides to enter the alumina lattice and prevent or substantially reduce subsequent transition to alpha alumina.

All surface areas throughout the specification and the appended claims are measured by the B.E.T. or equivalent method. The terminology used to describe the metals herein, that is, the rare earth or lanthanide series and the Group IVB metals, is the terminology used in association with the common long form of the Periodic Table of Elements. Thus the Group IVB metals are titanium, zirconium, and thorium hafnium and the rare earth or lanthanide metals are metals of atomic number 57 to 71.

The catalyst composition may also contain a minor amount of other ingredients, up to about 5 percent by weight of the composite, which may serve as promoters, activators, or other purposes, for oxidation or reduction reactions. Such ingredients may include, for example, manganese, vanadium, copper, iron, cobalt, and nickel usually as the metal oxide or sulfide.

The calcined composite may be formed to any desired shape such as a powder, beads, or pellets. This shaping or fabricating is accomplished before calcination to promote particle adhesion. After calcination, a platinum group metal is added to the composite. Additionally, the composite can be applied or deposited on a relatively inert support or substrate and the platinum group metal then added, or the catalyst composition ca be applied or deposited onto the inert support.

For compositions made in accordance with this invention, the composite generally comprises about 50 to 95 weight percent alumina, and about 2 to 25 weight percent of rare earth metal oxide, preferably about 5 to 15 weight percent, based on the total weight of composite. The Group IVB metal oxide, if used alone with the rare earth metal oxide, may be present in about 2 to 25 weight percent of the composite, preferably about 5 to 15 weight percent, but if used in combination with chromium and/or tungsten oxide may be present in about 2 to 15 weight percent, preferably about 5 to 15 weight percent of the composite. The Cr or W oxide may be present in about 2 to 25 weight percent, preferably about 5 to 15 weight percent of the composite. Mixtures of Group IVB metal oxides and chromium and/or tungsten oxides may be present in about 5 to 30 weight percent, preferably about 5 to 15 weight percent of the composite. If the amount of alumina is too low, the resulting composite will not provide enough surface area to provide catalytic activity. If more alumina is present than stated, it may not be stabilized sufficiently and will lose surface area in the transition to the alpha form.

Generally, to provide the advantages of this invention, it is necessary for the stabilizing component to be in intimate association with the alumina during pre-calcining. An intimate admixture may be achieved, for example, by forming a slurry of alumina with water soluble compounds of the stabilizing components. Where desired, hydrated alumina, such as aluminum trihydrate is admixed with aqueous solutions of a rare earth metal salt and at least one of the other metal salts of this invention to permit sorption of the stabilizing components by the alumina. The solids are then recovered from the slurry and calcined to provide the mixed oxide composite. The particulate alumina is preferably in finely divided or colloidal form to provide maximum sorption area. For example, finely divided freshly precipitated aluminum trihydrate having a particle size of 70 percent to 90 percent smaller than 325 mesh is useful. When large particle size alumina is used, the sorption of the stabilizing components from solution and subsequent calcination will provide at least a stabilized outer portion of the alumina.

Another method of preparing intimate admixture of alumina and stabilizing components is to coprecipitate all of the components, including the alumina, from aqueous solutions. Various methods of coprecipitation are suitable. Such methods include, for example, surface adsorption where one or more components in ionic form are sorbed on the surface of a precipitating solid; and inclusion, in which the coprecipitated compound or compounds have dimensions and a chemical composition which will fit into the crystal structure of a precipitating solid without causing appreciable distortion.

In coprecipitation, a suitable precipitant, usually a base, is added to an aqueous solution of the compounds. This can also be done by concurrent addition of both the precipitant and the compound solution to a vessel containing water. Preferably the precipitant is selected such that undesirable or unnecessary compounds are volatilizable and decomposable upon calcination at 850°C. or above, or removable by washing or extraction. The precipitant is capable of initiating and completing essentially simultaneous coprecipitation of the components. Suitable precipitants are ammonium compounds such as ammonium hydroxide or ammonium carbonate as well as other hydroxides and carbonates of the alkali metals.

The precipitant may be in dilute or concentrated aqueous solution. The rapidity of addition of the precipitant and the degree of agitation used will vary depending upon the precipitate desired. Dilute precipitant solutions, slow addition, and vigorous agitation generally favor a coarser precipitate. The temperature during the addition of precipitant may be from about 0° to 90°C. Higher temperatures generally produce a coarser precipitate. The precipitant is added until a pH of about 5 to 9.0 is reached. At this time the coprecipitated mixture is recovered from the slurry, washed if desired, and digested or recrystallized if desired.

The intimate admixture of alumina and stabilizing components are calcined at a temperature of at least about 850°C., preferably about 900° to 1200°C., but not at such a high temperature or for such a long period of time to unduly sinter the composite. The conditions of the calcination are such as to provide a catalytically-active composite having a relatively high surface area of at least about 25 square meters per gram, and preferably at least about 75. Calcination is preferably conducted while the admixture is unsupported and in free-flowing condition. This is preferable for economic reasons and to prevent undue sintering.

Calcination in air to form the composite, and prior to the addition of a platinum group metal, is an integral part of the subject invention. It is found that an intimate admixture of the stabilizing components and the alumina is stable when calcined at such temperatures before any further preparative steps are performed. Since both the alumina and the stabilizing components are intimately admixed, the concurrent heating in close association substantially reduces any undesirable alumina transitions. Additionally, calcination before deposit on an inert substrate promotes adhesion of the calcined composite to the substrate thus allowing the use of higher space velocities with the finished catalyst composition with less chance of erosion. Further, calcination substantially reduces the possibility of reaction of the stabilizing component and alumina component with the substrate. Any such reactions between the alumina and the substrate promotes the formation of inactive forms of alumina thereby reducing its surface area and activity. If the stabilizing component were to react with the substrate, it would reduce the effective amount of this component available for stabilization. A further advantage of such calcination is economic because less heat in smaller furnaces is required to calcine the resulting powder composite before it is placed on an inert support. Further, it is essential that the calcination is conducted before the addition of a platinum group metal component to prevent loss of such component by occlusion.

Suitable aluminum-containing compounds are alumina, the gamma, eta, kappa, delta, and theta forms of alumina and for coprecipitation, the water soluble aluminum compounds such as salts, for example, the aluminum halides, aluminum nitrate, aluminum acetate, and aluminum sulfate.

The rare earth metal compounds which may be employed to produce the catalytic composite are, for example, the compounds of cerium, lanthanum, neodymium, samarium, praseodymium, and the like as well as commercially available mixtures of rare earths. The rare earth used is preferably cerium. If a mixture of rare earths is used, the mixture is preferably one in which cerium is the predominant component. Suitable water soluble rare earth metal compounds include the acetates, halides, nitrates, sulfates, and the like, e.g., $Ce(C_2H_3O_2)_3$, $CeBr_3$, $Ce(NO_3)_3$, $Ce_2(SO_4)_3$, $Nd(C_2H_3O_2)_3$, $Sm(NO_3)_3$, and $TmBr_3$.

The Group IVB metal oxides, i.e., the oxides of titanium, thorium zirconium, and hafnium, are added to the alumina in the form of their water soluble precursors. Thus, for example, water soluble IVB metal salts such as the nitrates, acetates, halides, and sulfates and the like might be employed. Suitable water soluble compounds are $Zr(NO_3)_4$, $ZrCl_4$, $Zr(SO_4)_2$, $ZrOCl_2$, $Ti_2(C_2O_4)_3$, and $HfOCl_2$.

Water soluble compounds of chromium and tungsten which can be used are, for example, chromium acetate, chromium nitrate, chromium halides, chromium oxide (chromic acid), chromium oxalate, and complexes of chromium such as chloropentamine chromium chloride, tungsten halides, tungsten oxy-salts, such as tungsten dioxydichloride, ammomium tungstate, and the like.

A platinum group metal is added to the calcined composite to form the catalyst compositions of this invention, which are found to be effective for long time high temperature reactions. Such metals are usually added or incorporated in amounts sufficient to provide significant activity. The platinum group metals useful are platinum, ruthenium, palladium iridium, and rhodium. The choice of metal, metal combinations or alloys is governed largely by activity, specificity, volatility, deactivation by specific components included with the reactants, and economics.

The quantity of platinum group metal added to the calcined composite depends first on design requirements such as activity and life and second on economics. Theoretically, the maximum amount of such metal is enough to cover the maximum amount of surface available without causing undue metal crystallite growth and loss of activity during use. Two major competing phenomena are involved in such surface treatment. It is desirable to completely cover the substrate surface to provide the greatest amount of platinum group metal coverage, thereby obtaining maximum activity, but if the surface were to be completely covered, such coverage would promote growth between adjacent crystallites, which growth would then decrease the surface area and greatly reduce activity. A balance of maximum coverage coupled with proper dispersion thus must be achieved to formulate a practical catalyst. An ancillary consideration in relation to the amount of platinum group metal is the allowable size of the catalyst housing. If the size is small, the amount of platinum group metal component used is preferably increased within the above-described limits. For example, for automobile exhaust treatment, the allowable size is relatively small, especially if unitary honeycomb type supports are used and a higher loading may be desirable. Economics, of course, dictates the use of the least amount of platinum group metal component possible while accomplishing the main objective of promoting the reaction. Generally, the amount of platinum group metal used is a minor portion of the catalyst composite and typically does not exceed about 20 weight percent of the calcined composite. The amount may be about 0.1 to 20 percent and is preferably about 0.2 to 10 percent to economically maintain good activity with prolonged use. These percentages are based on the weight of the calcined composite. If the composite is used on an inert substrate, the composite may be, for example, about 10 percent of the weight of the substrate and the percent weight of platinum group metal in relation to the total weight of substrate and composite will be correspondingly less.

During preparation of the catalyst composition, various compounds and/or complexes as well as elemental dispersions of any of the platinum group metals may be used to achieve deposition of the metal on the composite. Water soluble platinum group metal compounds or complexes may be used. The platinum group metal may be precipitated from solution, for example, as a sulfide by contact with hydrogen sulfide. The only limitation on the carrier liquids is that the liquids should not react with the platinum group metal compound and be removable by volatilization or decomposition upon subsequent heating and/or vacuum, which may be accomplished as part of the preparation or in the use of the completed catalyst composition. Suitable platinum group metal compounds are, for example, chloroplatinic acid, potassium platinum chloride, ammonium platinum thiocyanate, platinum tetrammine hydroxide, platinum group metal chlorides, oxides, sulfides, and nitrates, platinum tetrammine chloride, palladium tetrammine chloride, sodium palladium chloride, hexammine rhodium chloride, and hexammine iridium chloride. If a mixture of platinum and palladium is desired, the platinum and palladium may be in water soluble form, for example, as amine hydroxides or they may be present as chloroplatinic acid and palladium nitrate when used in preparing the catalyst of the present invention. The platinum group metal may be present in the catalyst composition in elemental or combined forms, e.g., as an oxide or sulfide. During subsequent treatment such as by calcining or upon use, essentially all of the platinum group metal is converted to the elemental form.

While these catalyst compositions are useful in many reactions, they are not necessarily equivalent in all processes nor are those which are useful in the same process necessarily exactly equivalent to each other.

While it is not essential, the catalyst compositions of this invention preferably have a relatively catalytically-inert support or substrate. The supports which can be employed in this invention are preferably unitary, skeletal structures of relatively large size, e.g., honeycombs. However, smaller particle forms may be used, e.g., pellets or spheres. The size of these pellets can be altered depending upon the system, its design and operating parameters in which they are to be used, but may range from about 1/64 to ½ inch, preferably 1/32 to ¼inch, in diameter; and their lengths are about 1/64 to 1 inch, preferably about 1/32 to ¼ inch.

When a support is used, the calcined composite is generally present in a minor amount of the total catalyst composition, which is usually about 2 to 30 weight percent preferably about 5 to 20 weight percent, based on the total weight of the composite and support. The amount used depends on economics, size limitations, and design characteristics.

These supports whether of the unitary-skeletal type or pellets are preferably constructed of a substantially inert, rigid material capable of maintaining its shape and strength at high temperatures, for example, up to about 1800°C. The support typically has a low thermal coefficient of expansion, good thermal shock resistance, and low thermal conductivity. While a support having a porous surface is preferred, the surface may be relatively non-porous, but in such event it is desirable to roughen the surface to improve adhesion of deposited compositions.

The support may be metallic or ceramic in nature or a combination thereof. The preferred supports, whether in skeletal or other form, are composed primarily of refractory metal oxide including combined oxide forms, e.g., alumino-silicates. Suitable support materials include cordierite, cordierite-alpha alumina, silicon nitride, silicon carbide, zircon-mullite, spodumene, alumina-silica-magnesia, and zirconium silicate. Examples of other suitable refractory ceramic materials are sillimanite, magnesium silicates, zircon, petalite, alpha-alumina, and aluminosilicates. Although the support may be a glass ceramic, it is preferably unglazed and may be essentially entirely crystalline in form and marked by the absence of any significant amount of glassy or amorphous matrices. Further, the structure may have considerably accessible porosity, preferably having a water pore volume of at least about 10 percent. Such supports are described in U.S. Pat. No. 3,565,830, herein incorporated by reference.

The geometric, superficial, or apparent surface area of the skeletal or honeycomb type supports, including the walls of the gas flow channels is generally about 0.5 to 6, and preferably 1 to 5, square meters per liter of support. This surface area is sufficient for deposition of a satisfactory quantity of the composite or the finished catalyst composition. The plurality of channels, about 100 to 2500, preferably 150 to 500 per square inch of cross-sectional area, may be distributed across the entire face of the structure and frequently they define an open area in excess of 60 percent of the total area of the support. The walls must be thick enough to provide rigidity and integrity to the structure while maintaining good apparent surface area. The wall thickness is thus in the range of about 2 to 25 mils. The flow channels can be of any shape and size consistent with the desired superficial surface area and should be large enough to permit relatively free passage of the gaseous reaction mixture; preferably the length of the channels is at least about 0.1 inch to insure sufficient contact or residence time to cause the desired reaction. Although the channels are generally parallel, they may be multi-directional and may communicate with one or more adjacent channels.

In one manner of preparing structures provided with catalyst compositions of this invention, an aqueous slurry of the essentially water insoluble calcined composite of alumina and stabilizing component is contacted with the support. The solid content of the slurry forms an adherent deposit on the support, and the resulting supported composite is dried or calcined for a second time at a temperature which provides a relatively catalytically-active product. The second drying or calcination takes place at a temperature low enough to prevent undue sintering of the mixture. Suitable calcination temperatures are generally about 300°–700°C. to insure catalytic activity without undue sintering, preferably about 400°–600°C. After this second calcination the coating on the support has a surface area of at least about 75 s.m.p.g. Lower temperatures can be employed to dry the composite if the second calcination is not performed.

After the coated support is dried or calcined, a platinum group metal component is added to enhance the catalytic activity of the composite. The platinum group metal may be added to the coated support in the manner previously described. Preferably, this addition is made from an aqueous or other solution to impregnate or deposit the platinum group metal component on the coated support.

After addition of the platinum group metal, the resulting structure is dried and may be calcined for a third time under conditions which provide a composition having characteristics that enhance selected reactions. This final calcination stabilizes the completed catalyst composition so that during the initial stages of use, the activity of the catalyst is not materially altered. The temperature of this final calcination must be low enough to prevent substantial sintering of the underlying coating which would cause substantial occlusion of the platinum group metal component. Thus the calcination may be conducted at temperatures of about 300°–700°C., preferably about 400°–600°C.

An alternative method of making the catalyst compositions of this invention if a relatively inert support is used involves adding the platinum group metal component to the calcined composite before the composite is deposited on the support. For example, an aqueous slurry of the calcined composite can be prepared and the platinum group metal component added to the slurry and mixed intimately therewith. The platinum group metal component can be in the form already described and may be precipitated as previously described. The final mixture containing the platinum group metal may then be dried or calcined to provide a catalytically-active composition in a form suitable for deposition on a support or for use without such deposition as a finished catalyst in either finely divided or macrosize forms. Subsequent calcinations or drying may be conducted as described above. The calcined material generally has a surface area of at least about 25 s.m.p.g., preferably at least about 75 s.m.p.g.

The following are examples of the general method of preparation of some representative stabilized catalytic composites and compositions of this invention. All percentages, parts, and proportions herein and in the appended claims are by weight unless otherwise indicated.

EXAMPLE I

A stabilized $CeO_2$, $ZrO_2$, and $Al_2O_3$ composite slip is prepared by dissolving 17.82 grams of cerium nitrate and 14.41 grams of zirconyl nitrate in 628 ml $H_2O$ to form a total volume of 632.5 ml. 275 grams of activated $Al_2O_3$ powder is stirred into the solution with constant agitation for 10 minutes. The total solution is then evaporated to dryness under heat and with agitation, transferred to a drying oven at 120°C., and dried overnight. The dried solids are ground to less than 20 mesh and calcined at 970°C. for one hour. Five grams of the composite having a density of 0.476 g/cc and containing 3.3% ceria, 3.3% zirconia, and 93.4% alumina, is then tested for retention of surface area by calcining at 1200°C. for 2 hours. It is found that the surface area after such calcination is 36.6 $m^2/g$.

EXAMPLE II 186 grams of the calcined powder from EXAMPLE I are mixed with 286 ml. $H_2O$ and 13.9 ml. conc. $HNO_3$, and ball-milled for 19 hours at 68 RPM in a U.S. Stoneware 1-gallon mill jar. 330 ml. of the resulting slip having a density of 1.4 g/cc and a pH of 4.45 are diluted with 30 ml of water to a viscosity of about 68 cps. A 20 cubic inch cordierite honeycomb having about 250 parallel gas passages per square inch of cross-sectional area is dipped into this diluted slip, drained, blown with air, dried at 120°C. for 2 ½ hours, and calcined at 500°C. for 2 hours. The adherent composite makes up approximately 17 weight percent of the coated honeycomb.

EXAMPLE III

A honeycomb, coated with a ceria-zirconia-alumina composite slip is prepared as in EXAMPLE II. The coated honeycomb is then dipped into about 420 ml. of a solution containing both $H_2PtCl_6$ and $Na_2PdCl_4$, concentrations of each being such that there is theoretically 0.9% Pt by weight of solution and 0.3% Pd by weight of solution. After standing for 10 minutes with intermittent raising and lowering of the honeycomb into the solution, the honeycomb is withdrawn from the solution, drained, and excess solution blown off. The honeycomb is then treated with gaseous hydrogen sulfide for 15 minutes, and washed chloride-free using deionized water. The resulting impregnated honeycomb is dried overnight at 110°C., and calcined in flowing air for 2 hours at 500°C. The finished catalyst contains about 0.4 weight % Pt and 0.1 weight percent Pd.

EXAMPLE IV

A zircon-mullite honeycomb is coated with a composite slip containing $Cr_2O_3$, $CeO_2$ and $Al_2O_3$ and then impregnated with Pt using the ammine hydroxide as the platinum source. 1200 g. of activated alumina powder, less than 40 mesh in size, is slurried in a mixer with a solution prepared by dissolving 1263 g. $Cr(NO_3)_3 \cdot 9H_2O$ and 691 g. $Ce(NO_3)_3 \cdot 6H_2O$ in 156 ml. $H_2O$ at 75°C. A further 240 ml. of $H_2O$ is slowly added and the whole mixed for ½ hour. At the end of this time, the mass is uniform in appearance and dark green. The mass is then dried at 110°C., resulting large lumps are crushed, and the material is then dried for 16 hours at this temperature. After drying, the solids are crushed and screened to less than 40 mesh, and the powder is calcined for 4 hours at 1000°C. 350 g. of the powder is charged to a ½ gallon ball mill, and 350 ml. $H_2O$, 7 ml. conc. $HNO_3$ and ceramic balls are added. The mill is rolled for 16 hours at 99 RPM. The pH of the slurry is 3.7. 300 ml. of the slurry are diluted with 100 ml. $H_2O$ containing 1 ml. conc. $HNO_3$. A zircon-mullite honeycomb, from American Lava Corporation, with about 100 flow paths per square inch of cross-section, is dipped in the diluted slip and held for 1 minute, then withdrawn and blown with air to remove excess slip. The honeycomb is dried 16 hours at 110°C., and then calcined for 2 hours at 1000°C. The cooled honeycomb shows a pickup of 16.7 weight percent composite slip which has a composition of approximately 70 percent by weight alumina, 14 percent by weight chromia, and 16 percent by weight ceria. The coated honeycomb is then dipped in an aqueous solution of platinum tetrammine hydroxide, having 0.435 g. platinum in 184 ml. of solution, for 1 minute, then the excess blown off and the catalyst dried at 110°C. After drying, the honeycomb is calcined for 2 hours at 400°C. The final honeycomb contains nominally 0.5 weight percent Pt.

EXAMPLE V

A zircon-mullite honeycomb is coated with a composite containing $Cr_2O_3$, $CeO_2$ and $Al_2O_3$ and impregnated with Pd using the ammine hydroxide.

This catalyst is prepared exactly as the catalyst of Example IV except that instead of Pt, the slip-coated honeycomb is dipped in a palladium tetrammine hydroxide solution, yielding a final honeycomb containing, nominally, 0.5 weight percent Pd.

EXAMPLE VI

An alpha-alumina honeycomb is coated with a composition prepared by ball-milling a ceria-chromia-alumina powder with a palladium nitrate solution.

A ceria-chromia-alumina powder was prepared and calcined as in Example IV, except that instead of milling the powder and depositing it on a honeycomb for subsequent platinum group metal deposition, a different procedure is used. The powder is ball-milled with a solution of $Pd(NO_3)_2$ in distilled water for 17 hours at 114 RPM. It is then diluted with an equal volume of 1 percent (conc.) $HNO_3$ in water, and this diluted slip is used to dip an alpha-alumina honeycomb having 17 corrugations/inch. After blowing off the excess slurry, the honeycomb is dried at 110°C., then is calcined 2 hours at 500°C. 7.4 weight percent slip is taken up. The coated block is again dipped in a freshly-prepared slurry of composite, prepared as above. After drying and calcining, weighing shows the block contains 12.0 weight percent slip, and 0.21 weight percent Pd.

EXAMPLE VII

A ceria-chromia-zirconia-alumina composite is prepared by dissolving 22.95 g. of cerium nitrate, 18.56 g. of zirconyl nitrate, and 47.92 g. of chromium nitrate in 587.5 ml. $H_2O$ for a final volume of 632.5 ml., and 275 g. of activated alumina powder is added to the solution with constant agitation for 10 minutes. The slurry is then evaporated to dryness with heat and agitation, transferred to a drying oven at 120°C., and then dried overnight. The dried solids are ground to less than 20 mesh and calcined at 970°C. for 1 hour. 5 grams of the composite having a density of 0.958 g/cc and containing 4% ceria, 4% chromia, 4% zirconia, and 88% alumina is then calcined for 2 hours at 1200°C. It is found that the surface area after such calcination is 29.9 g/m².

EXAMPLE VIII 191 g. of a ceria-chromia-zirconia-alumina composite as prepared in EXAMPLE VII is transferred to a 1 qt. ball mill jar containing 665 g. of stones. 191 cc $H_2O$ plus 14.4 conc. $HNO_3$ is then added. The whole is then ball-milled for 19 hours at 66 RPM. The slurry is poured out, diluted with 40 ml. of water to a viscosity of 15 cps, and then used to coat the same type of honeycomb as in EXAMPLE IV and by the same procedure. The catalyst so prepared, after calcination at 500°C., contains 13 weight percent composite on the total weight of coated honeycomb.

EXAMPLE IX

A composite is prepared containing a commercial rare earth mixture, chromia, and alumina. 14.87 grams of a mixture of rare earth nitrates is used. The composition converted to the theoretical oxide content is as follows: $CeO_2$ 48%; $La_2O_3$ 24%; $Nd_2O_3$ 17%; $Pr_6O_{11}$ 5%; $Sm_2O_3$ 3%; $Gd_2O_3$ 2%; $Y_2O_3$ 0.2%; others 0.8%. The rare earth mixture and 3.95 grams of $CrO_3$ are dissolved in water and diluted to 80.3 ml. 51 grams of alumina having a surface area of 300 m²/g after grinding is added to the solution with agitation for 5 minutes. The slurry is transferred to an evaporating dish, dried with agitation for one hour under an infrared lamp, transferred to an oven and dried at 110°C. overnight. The dried mixture weighed 65.1 grams containing 10 percent by weight rare earth oxide mixture, 5 percent by weight chromia, and 85 percent by weight alumina. The mixture is crushed to a powder and a 5 gram portion is calcined at 1200°C. for four hours. The surface area of the calcined powder is 43.7 m²/g.

EXAMPLE X

A 1 × 3 inch zircon mullite honeycomb having 12 corrugations per inch is coated with a composite prepared as in EXAMPLE IX except a two kilogram batch is prepared and chromium nitrate is used in place of $CrO_3$. After the dried powder is pulverized, it is calcined at 1000°C. for 4 hours to form a composite. 240 grams of the composite is added to a 1 ¼ gallon ball mill with about 10 pounds of stones. 432 ml. of water and 18 ml. concentrated nitric acid are added; the slurry is milled for 17 hours and cooled to 25°C. The slurry has a density of 1.49 grams per cubic centimeter and a viscosity of 12 cps. 1 percent nitric acid is added to a density of 1.38 grams per cubic centimeter. The slurry is then placed in a container and stirred continuously. The honeycomb is immersed in the slurry, blown dry and dried at 110°C. overnight. The coated honeycomb is calcined for 2 hours at 500°C. and weighed. The honeycomb picks up 15.3 percent composite on the total weight of coated honeycomb. The honeycomb is then immersed in a solution composed of 18 grams of $Na_2PdCl_4$ dissolved in 51 ml. of water for ½ hour. The honeycomb is then removed, the excess palladium solution blown off, and the deposit is hydrolyzed in hot sodium bicarbonate solution. The honeycomb thus treated is then washed chloride free and dried at 110°C. overnight. The final weight gain of the honeycomb is 1.05 percent PdO.

EXAMPLE XI

A composite is prepared by coprecipitation. The composition is the same as that in EXAMPLE X, i.e., 10 percent of a rare earth oxide mixture, 5 percent chromia, and 85 percent alumina. 187.7 grams of aluminum nitrate, 7.4 grams of the same rare earth nitrate mixture used in EXAMPLE IX, and 7.9 grams of chromium nitrate are dissolved in series in one liter of water and the solution transferred to a dropping funnel. A second solution was prepared containing 400 ml. of ammonium hydroxide (28.3% $NH_3$) and 1600 ml. water and transferred to a dropping funnel. 2000 ml. of water is added to a 6 liter beaker with vigorous mechanical stirring. The nitrate solution is then added at room temperature to the water in the beaker over a period of 30 minutes. The ammonia solution is added concurrently with the nitrate solution at such a rate as to keep the pH of the slurry in the beaker at 9.0. After complete addition of the nitrate solution, it is found that 580 ml. of the ammonia solution is added. Stirring is continued for 15 minutes after the coprecipitation is complete. The slurry is allowed to stand overnight and then filtered and re-slurried in 2 liters of water. The second slurry is filtered, excess water removed, and dried for four days at room temperature. The filter cake is hand ground to a powder, dried for 1 day at room temperature, and overnight at 110°C. 42 g. of composite are recovered. The surface area is good after calcination at 1200°C. for 4 hours.

Representative compositions prepared by the same methods as set forth in the Examples and results obtained after calcination at 1200°C. are reported in TABLE I.

In the practice of this invention the catalytic compositions are particularly useful when employed with the high temperature oxidation of carbonaceous fuels. For example, they may be used advantageously in a method employing a catalytically-supported thermal combustion of carbonaceous fuel, as more fully described in co-pending application Ser. No. 358,411, filed May 8, 1973, of W. C. Pfefferle, assigned to the assignee hereof and which application is incorporated by reference herein. This method includes the essentially adiabatic combustion of at least a portion of a carbonaceous fuel admixed with air in the presence of a catalytic composition of this invention at an operating temperature substantially above the instantaneous auto-ignition temperature of the fuel-air admixture but below a temperature that would result in any substantial formation of oxides of nitrogen.

Flammable mixtures of most fuels with air are normally such as to burn at relatively high temperatures, i.e., about 3300°F. and above, which inherently results in the formation of substantial amounts of nitrogen oxides or $NO_x$. However, little or no $NO_x$ is formed in a system which burns the fuel catalytically at relatively low temperatures.

For a true catalytic oxidation reaction, one can plot temperature against rate of reaction. For any given catalyst and set of reaction conditions, as the temperature is initially increased, the reaction rate is also increased. This rate of increase is exponential with temperature. As the temperature is raised further, the reaction rate then passes through a transition zone where the limiting parameters determining reaction rate shift from catalytic to mass transfer. When the catalytic rate increases to such an extent that the reactants cannot be transferred to the catalytic surface fast enough to keep up with the catalytic reaction rate, the reaction shifts to mass transfer control, and the observed reaction rate changes much less with further temperature increases. The reaction is then said to be mass transfer limited. In mass transfer controlled catalytic reactions, one cannot distinguish between a more active catalyst and a less active catalyst because the intrinsic catalyst activity is not determinative of the rate of reaction. Regardless of any increase in catalytic activity above that required for mass transfer control, a greater catalytic conversion rate cannot be achieved for the same set of conditions.

It has been discovered that it is possible to achieve essentially adiabatic combustion in the presence of a

TABLE I

| | | % Chemical Composition | | Composite Surface Areas | Final Calcination at 1200°C. | |
|---|---|---|---|---|---|---|
| No. | % $Al_2O_3$ | Rare Earth | IVB | VIB | Time hrs. | Surface Area $m^2/g$ |
| 1 | 100 | — | — | — | 4 | 8 |
| 2 | 93.4 | 3.3% $CeO_2$ | 3.3% $ZrO_2$ | | 2 | 37 |
| 3 | 88.4 | 5.0% $CeO_2$ | 6.6% $ZrO_2$ | | 2 | 26.6 |
| 4 | 88.4 | 6.6% $CeO_2$ | 5.0% $ZrO_2$ | | 2 | 36 |
| 5 | 85.4 | 6.6% $CeO_2$ | 8.0% $ZrO_2$ | | 2 | 40 |
| 6 | 80.1 | 6.6% $CeO_2$ | | 13.3% $Cr_2O_3$ | 2 | 24 |
| 7 | 85 | 10% rare earth* | | 5% $Cr_2O_3$ | 4 | 43.7 |
| 8 | 85 | 5.4% $CeO_2$ 2.7% $La_2O_3$ 1.9% $Nd_2O_3$ | | 5% $Cr_2O_3$ | 4 | 35.3 |
| 9 | 85 | 10% $Nd_2O_3$ | 2 | 5% $Cr_2O_3$ | 4 | 28.9 |
| 10 | 88 | 4% $CeO_2$ | 4% $ZrO_2$ | 4% $Cr_2O_3$ | 2 | 29.9 |

| | | | |
|---|---|---|---|
| $CeO_2$ | 48% | $Sm_2O_3$ | 3.0% |
| $La_2O_3$ | 24% | $Gd_2O_3$ | 2.0% |
| $Nd_2O_3$ | 17% | $Y_2O_3$ | 0.2% |
| $Pr_6O11$ | 5% | Others | .8% | catalyst at a reaction rate many times greater than the mass transfer limited rate. That is, catalytically-supported, thermal combustion surmounts the mass transfer limitation. If the operating temperature of the catalyst is increased substantially into the mass transfer limited region, the reaction rate again begins to increase exponentially with temperature. This is an apparent contradiction of catalytic technology and the laws of mass transfer kinetics. The phenomena may be explained by the fact that the catalyst surface and the gas layer near the catalyst surface are above a temperature at which thermal combustion occurs at a rate higher than the catalytic rate, and the temperature of the catalyst surface is above the instantaneous auto-ignition temperature of the fuel-air admixture (defined hereinbelow). The fuel molecules entering this layer spontaneously burn without transport to the catalyst surface. As combustion progresses, it is believed that the layer becomes deeper. The total gas is ultimately raised to a temperature at which thermal reactions occur in the entire gas stream rather than only near the surface of the catalyst. At this point, the thermal reactions continue even without further contact of the gas with the catalyst as the gas passes through the combustion zone.

The term "instantaneous auto-ignition temperature" for a fuel-air admixture as used herein and in the appended claims is defined to mean that the ignition lag of the fuel-air mixture entering the catalyst is negligible relative to the residence time in the combustion zone of the mixture undergoing combustion.

This method can employ an amount of fuel equivalent in heating value of about 300–1000 pounds of propane per hour per cubic foot of catalyst. There is no necessity of maintaining fuel-to-air ratios in the flammable range, and consequently loss of combustion (flame-out) due to variations in the fuel-to-air ratio is not as serious a problem as it is in conventional combustors.

The adiabatic flame temperature of fuel-air admixtures at any set of conditions (e.g., initial temperature and, to a lesser extent, pressure) is established by the ratio of fuel to air. The admixtures utilized are generally within the inflammable range or are fuel-lean outside of the inflammable range, but there may be instances of a fuel-air admixture having no clearly defined inflammable range but nevertheless having a theoretical adiabatic flame temperature within the operating conditions of the invention. The proportions of the fuel and air charged to the combustion zone are typically such that there is a stoichiometric excess of oxygen based on complete conversion of the fuel to carbon dioxide and water. Preferably, the free oxygen content is at least about 1.5 times the stoichiometric amount needed for complete combustion of the fuel. Although the method is described with particularity to air as the non-fuel component, it is well understood that oxygen is the required element to support proper combustion. Where desired, the oxygen content of the non-fuel component can be varied and the term "air" as used herein refers to the non-fuel components of the admixtures. The fuel-air admixture fed to the combustion zone may have as low as 10 percent free oxygen by volume or less, which may occur, for example, upon utilization as a source of oxygen of a waste stream wherein a portion of this oxygen has been reacted. In turbine operations, the weight ratio of air to fuel charged to the combustion system is often above about 30:1 and some turbines are designed for air-to-fuel ratios of up to about 200 or more:1.

The carbonaceous fuels may be gaseous or liquid at normal temperature and pressure. Suitable hydrocarbon fuels may include, for example, low molecular weight aliphatic hydrocarbons such as methane, ethane, propane, butane, pentane; gasoline; aromatic hydrocarbons such as benzene, toluene, ethylbenzene, xylene; naphtha; diesel fuel; jet fuel; other middle distillate fuels; hydrotreated heavier fuels; and the like. Among the other useful carbonaceous fuels are alcohols such as methanol, ethanol, isopropanol; ethers such as diethylether and aromatic ethers such as ethylphenyl ether; and carbon monoxide. In burning diluted fuels containing inerts, for example, low BTU coal gas, fuel-air admixtures with adiabatic flame temperatures within the range specified herein may be either fuel rich or fuel lean. Where fuel rich mixtures are utilized, additional air or fuel-air admixture may be added to the catalyst zone effluent to provide an overall excess of air for complete combustion of fuel components to carbon dioxide and water. As stated previously, thermal reactions continue beyond the catalyst zone, provided the effluent temperature is substantially above the instantaneous auto-ignition temperature.

The fuel-air admixture is generally passed to the catalyst in the combustion zone at a gas velocity prior to or at the inlet to the catalyst in excess of the maximum flame propagating velocity. This may be accomplished by increasing the air flow or by proper design of the inlet to a combustion chamber, e.g., restricting the size of the orifice. This avoids flashback that causes the formation of $NO_x$. Preferably, this velocity is maintained adjacent to the catalyst inlet. Suitable linear gas velocities are usually above about three feet per second, but it should be understood that considerably higher velocities may be required depending upon such factors as temperature, pressure, and composition. At least a significant portion of the combustion occurs in the catalytic zone and may be essentially flameless.

The carbonaceous fuel, which when burned with a stoichiometric amount of air (atmospheric composition) at the combustion inlet temperature usually has an adiabatic flame temperature of at least about 3300°F., is combusted essentially adiabatically in the catalyst zone. Although the instantaneous auto-ignition temperature of a typical fuel may be below about 2000°F., stable, adiabatic combustion of the fuel below about 3300°F. is extremely difficult to achieve in practical primary combustion systems. It is for this reason that even with gas turbines limited to operating temperatures of 2000°F., the primary combustion is typically at temperatures in excess of 4000°F. As stated above, combustion in this method is characterized by using a fuel-air admixture, having an adiabatic flame temperature substantially above the instantaneous auto-ignition temperature of the admixture but below a temperature that would result in any substantial formation of $NO_x$. The limits of this adiabatic flame temperature are governed largely by residence time and pressure. Generally, adiabatic flame temperatures of the admixtures are in the range of about 1700°F. to 3200°F., and preferably are about 2000°F. to 3000°F. Operating at a temperature much in excess of 3200°F. results in the significant formation of $NO_x$ even at short contact times; this derogates from the advantages of this invention vis-a-vis a conventional thermal system. A higher temperature within the defined range is desirable, however, because the system will require less catalyst and thermal reactions are an order of magnitude or more faster, but the adiabatic flame temperature employed can depend on such factors as the desired composition of the effluent and the overall design of the system. It thus will be observed that a fuel which would ordinarily burn at such a high temperature as to form $NO_x$ is successfully combusted within the defined temperature range without significant formation of $NO_x$.

The catalyst used in this method generally operates at a temperature approximating the theoretical adiabatic flame temperature of the fuel-air admixture charged to the combustion zone. The entire catalyst may not be at these temperatures, but preferably a major portion or essentially all, of the catalyst surface is at such operating temperatures. These temperatures are usually in the range of about 1700°–3200°F., preferably about 2000°F. to about 3000°F. The temperature of the catalyst zone is controlled by controlling the combustion of the fuel-air admixture, i.e., adiabatic flame temperature, as well as the uniformity of the mixture. Relatively higher energy fuels can be admixed with larger amounts of air in order to maintain the desired temperature in a combustion zone. At the higher end of the temperature range, shorter residence times of the gas in the combustion zone appear to be desirable in order to lessen the chance of forming $NO_x$.

The residence time is governed largely by temperature, pressure, and space throughput; and generally is measured in milliseconds. The residence time of the gases in the catalytic combustion zone and any subsequent thermal combustion zone may be below about 0.1 second, preferably below about 0.05 second. The gas space velocity may often be, for example, in the range of about 0.5 to 10 or more million cubic feet of total gas (standard temperature and pressure) per cubic foot of total combustion zone per hour. For a stationary turbine burning diesel fuel, typical residence times could be about 30 milliseconds or less; whereas in an automotive turbine engine burning gasoline, the typical residence time may be about 5 milliseconds or less. The total residence time in the combustion system should be sufficient to provide essentially complete combustion of the fuel, but not so long as to result in the formation of $NO_x$.

A method employing the catalyst of the present invention is exemplified in a series of runs in which the fuel is essentially completely combusted, and a low emissions effluent produced. The combustion system comprises a source of preheated air supplied under pressure. A portion of the air is passed through a pipe to the combustion zone, and the remainder is used to cool and dilute the combustion effluent. Unleaded gasoline fuel is atomized into the air passing to the combustion zone countercurrent to the air flow to insure intimate mixing.

In the first series of runs, the catalyst is of the monolithic, honeycomb-type having a nominal 6-inch diameter and is disposed within a metal housing as two separate pieces having parallel flow channels 2¼ inches to length extending therethrough. There is a small space of about ¼ inch between these pieces. Both pieces of catalyst have approximately 100 flow channels per square inch of cross-section with the walls of the channels having a thickness of 10 mils. The catalysts have similar compositions and are composed of a zircon mullite honeycomb support which carries a composite coating of alumina, chromia, and ceria containing palladium.

The catalyst for these runs is made by slurrying 2400 grams of activated alumina powder, less than 40 mesh in size, in a mixer with a solution prepared by dissolving 2526 grams $Cr(NO_3)_3 \cdot 9H_2O$ and 1382 grams $Ce(NO_3)_3 \cdot 6H_2O$ in 890 ml. $H_2O$. The mixture is dried at 120°C. over a weekend. The dried solids are crushed and screened to less than 40 mesh, and then the powder is calcined for four hours at 1000°C. to form the composite of this invention. 3200 grams of the composite is charged to a 3.4 gallon ball mill along with 3200 ml. $H_2O$ and 145.4 grams of palladium nitrate. The mill is rolled for 17 hours at 54 RPM. The resulting slurry has a density of 1.63 grams per ml., a pH of 4.20 and a viscosity of 12 centiposes. 1625 grams of the as-recovered slurry are diluted with 1180 ml. of a 1 percent nitric acid solution. The zircon mullite honeycomb is dipped in the diluted slurry and held for one minute, and then withdrawn from the slip and blown with air to remove the excess. The coated honeycomb is dried for 16 hours at 110°C. and then calcined for 2 hours at 500°C. The honeycomb is cooled, and showed a pickup of 11.0 weight percent composition.

The upstream or initial catalyst in the housing has a catalytic coating which comprises 13.9 weight percent of the catalyst. This coating is 70 weight percent alumina, 14 weight percent $Cr_2O_3$ and 16 weight percent $CeO_2$ based on these components. The catalyst also contains 0.23 weight percent palladium (calculated) disposed in the composite. The subsequent-in-line catalyst has a similar coating of alumina, ceria, and chromia which is 11.0 weight percent of the catalyst. The catalyst also contains 0.18 weight percent palladium (calculated) disposed in the coating.

Provision is made for contacting the fuel mixed with a portion of the total air stream with the catalyst. That portion of the total air stream not mixed with the fuel is added to the combustion effluent immediately upon its exit from the catalyst zone. This dilution or secondary air cools the combustion effluent and samples of the mixture are taken for analysis. Thermocouples are located adjacent the initial catalyst inlet and at the sampling position to detect the temperatures of these locations.

The catalysts are brought to reaction temperature by contact with preheated air, and subsequent contact with the air-fuel mixture which causes combustion and raised the catalyst temperature further. The results obtained using this system during two periods of operation in accordance with the present invention are reported in TABLE II below as Runs A and B, respectively.

The same reaction system and procedures are used in additional combustion runs employing different catalyst pieces that are disposed in the combustion zone to provide a thermal reaction space between the pieces. The catalysts have zircon mullite honeycomb supports and the initial catalyst has about 600 parallel gas flow channels per square inch of cross-section, while the second catalyst has about 100 channels per square inch. The gas flow path length of the first catalyst is two inches and of the second catalyst is one inch. The free space between the catalysts is 1⅝ inches in the direction of gas flow.

The catalysts are nominally 6 inches in diameter and are made as described above for the catalysts used in Runs A and B. Both catalysts contain a composite coating comprising 70 weight percent alumina, 16 weight percent $CeO_2$ and 14 weight percent $Cr_2O_3$, based on these components. The composite coating for the initial catalyst comprises 13.5 weight percent along with 0.26 weight percent palladium dispersed in the composite, and the composite coating for the second catalyst is 15.5 weight percent having 0.25 weight percent palladium dispersed in it. The results obtained using this system during two periods of operation in accordance with the present invention are reported in TABLE II, below as Runs C and D, respectively.

The data of TABLE II illustrate the effectiveness of the process of this invention in providing essentially complete combustion of relatively large quantities of fuel for a given amount of catalyst. No flashback is encountered in these runs, and the combustion effluents are exceedingly low in materials that are considered to be undesirable atmospheric pollutants, including nitrogen oxides.

oxidation contain a greater weight ratio of oxygen to carbon than in the material subjected to oxidation and in the case of exhaust purification these final oxidation products are much less harmful than the partially oxidized materials. Many such reaction systems are known in the art.

What is claimed is:

1. A catalyst composition characterized by a surface area of at least 20 $m^2/g$ after calcination for two hours at 1200°C. consisting essentially of (a) a catalytically-active, calcined composite of alumina, a rare earth metal oxide and a metal oxide selected from the group consisting of an oxide of chromium, tungsten, a Group IVB metal, and mixtures thereof, and (b) a catalytically-effective amount of a platinum group metal added thereto after calcination of said composite at a temperature of at least 850°C.

2. A composition as defined in claim 1 wherein said composite contains about 50 to 96 weight percent of

TABLE II

| RUN | Combustion Results | | | |
|---|---|---|---|---|
| | A | B | C | D |
| Reactions Conditions | | | | |
| Fuel rate, pounds per hour | 62 | 124 | 72 | 114 |
| Total air rate, pounds per second | 0.76 | 1.4 | 1.2 | 1.8 |
| Amount of air mixed with fuel, pounds per second | 0.61 | 1.1 | 0.7 | 1.1 |
| Amount of dilution air, pounds per second | 0.15 | 0.3 | 0.5 | 0.7 |
| Pressure of air stream, atmospheres | 1.9 | 2.9 | 3.0 | 4.3 |
| Nominal air velocity approaching catalyst inlet, feet per second | 40 | 50 | 35 | 35 |
| Fuel-air mixture temperature, °F. | 695 | 785 | 880 | 815 |
| Catalyst temperature, °F. (estimated by radiation pyrometry) | 2310 | 2470 | 2430 | 2400 |
| Temperature of diluted combustion effluent, °F. | 1700–2100 | 1800–2200 | 1800–2100 | 1900–2100 |
| Analysis of Diluted Combustion Effluent, ppmv | | | | |
| $NO_x$ | 0.2 | — | 0.7 | — |
| CO | 85 | 43 | 13 | 12 |
| Hydrocarbons (reported on propane basis) | 6 | 4 | 3.5 | 7 |

The catalysts of this invention can also be used for selected oxidation reactions at lower temperatures. In a typical oxidation they can be employed to promote the reaction of various chemical feedstocks by contacting the feedstock or compound with the catalyst in the presence of free oxygen preferably molecular oxygen. Although some oxidation reactions may occur at relatively low temperatures, many are conducted at elevated temperatures of about 150°C. to 900°C., and generally, these reactions occur with the feedstock in the vapor phase. The feeds generally are materials which are subject to oxidation and contain carbon, and may, therefore, be termed carbonaceous, whether they are organic or inorganic in character. The catalysts of this invention are particularly useful in promoting the oxidation of hydrocarbons, oxygen-containing organic components, for example, aldehydes, organic acids, and other intermediate products of combustion, such as carbon monoxide, and the like. These materials are frequently present in exhaust gases from the combustion of carbonaceous fuels, and thus the catalysts of the present invention are particularly useful in promoting the oxidation of such materials thereby purifying the exhaust gases. Such oxidation can be accomplished by contacting the gas stream with the catalyst and molecular or free oxygen. The oxygen may be present in the gas stream as part of the effluent, or may be added as air or in some other desired form having a greater or lesser oxygen concentration. The products from such said alumina, about 2 to 25 weight percent of said rare earth oxide and about 2 to 25 weight percent of said metal oxide.

3. A composition as defined in claim 2 wherein said rare earth oxide is ceria and wherein said metal oxide is chromia.

4. A composition as defined in claim 1 wherein said platinum group metal is present in an amount of about 0.1 to 20 percent by weight of said composite and is selected from the group consisting of platinum, palladium, platinum-palladium alloys, and mixtures thereof.

5. A composition as defined in claim 1 wherein said composite is pellet-form.

6. A catalyst composition consisting essentially of (a) an inert support (b) a catalytically-active calcined composite deposited on said support, said composite consisting essentially of alumina, a rare earth metal oxide, and a metal oxide selected from the group consisting of an oxide of chromium, tungsten, a Group IVB metal, and mixtures thereof, said composite having been calcined at a temperature of at least 850°C. before deposition on said support and characterized by a surface area of at least 20 $m^2/g$ after calcination for two hours at 1200°C., and (c) a catalytically-effective amount of a platinum group metal incorporated in said composite after deposition of said composite on said support.

7. A catalyst composition as defined in claim 6 wherein said support is pellet-form.

8. A catalyst composition as defined in claim 6 wherein said support is a ceramic honeycomb.

9. A catalyst composition as defined in claim 6 wherein said platinum group metal is present in an amount of about 0.2 to 10 percent by weight of said composite and wherein said platinum group metal is selected from the group consisting of platinum, palladium, platinum-palladium alloys, and mixtures thereof.

10. A catalyst composition as defined in claim 6 wherein said composite contains about 50 to 96 weight percent of said alumina, about 2 to 25 weight percent of said rare earth oxide, and about 2 to 25 weight percent of said metal oxide.

11. A catalyst composition as defined in claim 6 wherein said rare earth oxide is ceria and wherein said metal oxide is chromia.

12. A method for the preparation of a catalyst composition consisting essentially of (a) forming an intimate admixture consisting essentially of an alumina-producing aluminum compound, a rare earth compound which upon calcining yields the corresponding oxide and at least one metal compound which upon calcining yields the corresponding oxide wherein said metal compound is selected from the group consisting of a compound of chromium, tungsten, and a Group IVB metal and mixtures thereof, (b) calcining said intimate admixture at a temperature of at least 850°C. to form a catalytically-active composite containing alumina and the aforesaid rare earth and metal oxides, and characterized by a surface area of at least 20 m$^2$/g after calcination for two hours at 1200°C., and (c) incorporating a catalytically-effective amount of a platinum group metal to said calcined admixture.

13. A method as defined in claim 12 wherein said aluminum compound is alumina.

14. A method as defined in claim 12 further comprising depositing said composite on a relatively inert substrate to form a coating thereon prior to step (c).

15. A method as defined in claim 14 further comprising forming said intimate admixture into pellets before calcining.

16. A method as defined in claim 12 further comprising depositing said catalyst composition on a relatively inert substrate to form a coating after step (c).

17. A method as defined in claim 12 wherein said metal compound is chromium.

18. A method as defined in claim 12 wherein said intimate admixture is formed by coprecipitation of said compounds from an essentially aqueous solution thereof.

19. A method as defined in claim 18 wherein said coprecipitation is accomplished by adding an effective amount of water soluble base to said aqueous solution.

20. A method as defined in claim 18 further comprising depositing said composite on relatively inert substrate to form a coating thereon prior to step (c).

* * * * *